United States Patent [19]
DeLand

[11] Patent Number: 4,573,562
[45] Date of Patent: Mar. 4, 1986

[54] CLUTCH DISC ASSEMBLY

[75] Inventor: Daniel L. DeLand, Alma, Mich.

[73] Assignee: Alma Products Company, Alma, Mich.

[21] Appl. No.: 519,263

[22] Filed: Aug. 1, 1983

[51] Int. Cl.[4] ............................................. F16D 3/14
[52] U.S. Cl. .................................... 192/106.2; 464/68
[58] Field of Search ........................ 192/106.1, 106.2; 464/68

[56] References Cited

U.S. PATENT DOCUMENTS

| | | | |
|---|---|---|---|
| 3,578,121 | 5/1971 | Maurice | 192/106.2 |
| 3,809,198 | 5/1974 | Mori | 192/106.2 |
| 3,817,362 | 6/1974 | Rist | 192/106.2 X |
| 3,948,373 | 4/1976 | Wörner | 192/106.2 |
| 4,406,357 | 9/1983 | Nagano et al. | 192/106.2 |

Primary Examiner—Stephen F. Husar
Attorney, Agent, or Firm—Barnes, Kisselle, Raisch, Choate, Whittemore & Hulbert

[57] ABSTRACT

A clutch disc assembly comprising a drive clutch hub having a radial disc, a driven plate on one side of the disc, and a retainer plate on the opposite side of the disc and interconnected for movement with the driven plate. The disc, driven plate and retainer plate have generally aligned openings. First springs are provided in some of the openings and second springs are provided in others of the aligned openings. First stage friction members are provided between the disc and the driven plate and second stage friction pack comprising a thrust plate attached to the retainer plate and friction members is interposed between the retainer plate and the thrust plate.

13 Claims, 22 Drawing Figures

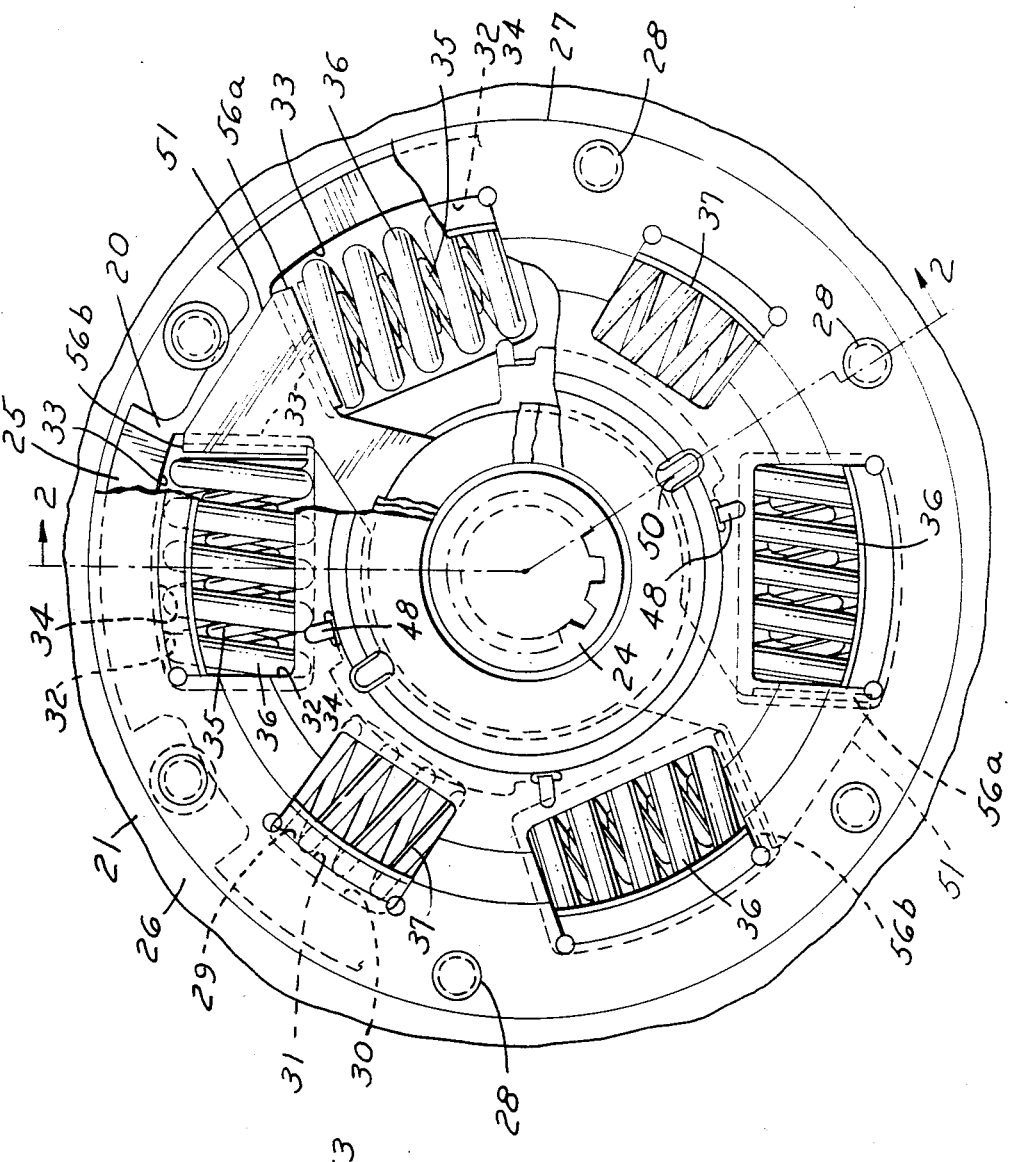
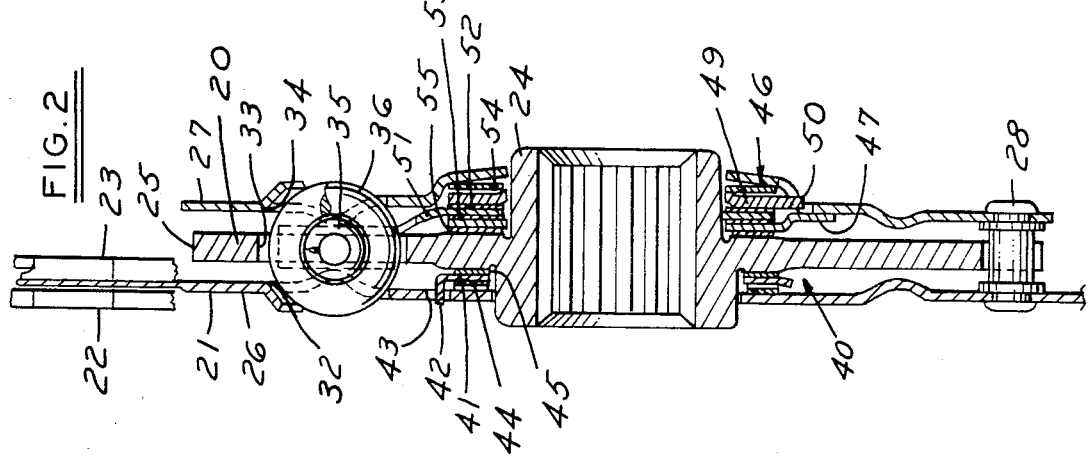

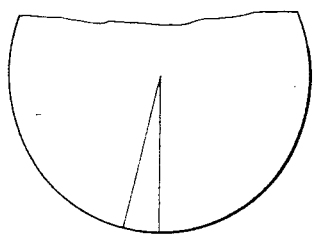
FIG.4C
FIG.4B
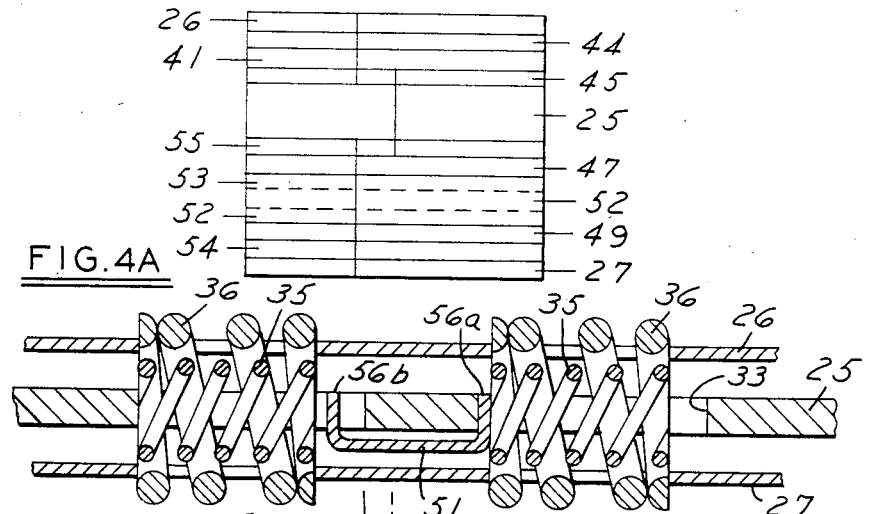
FIG.4A
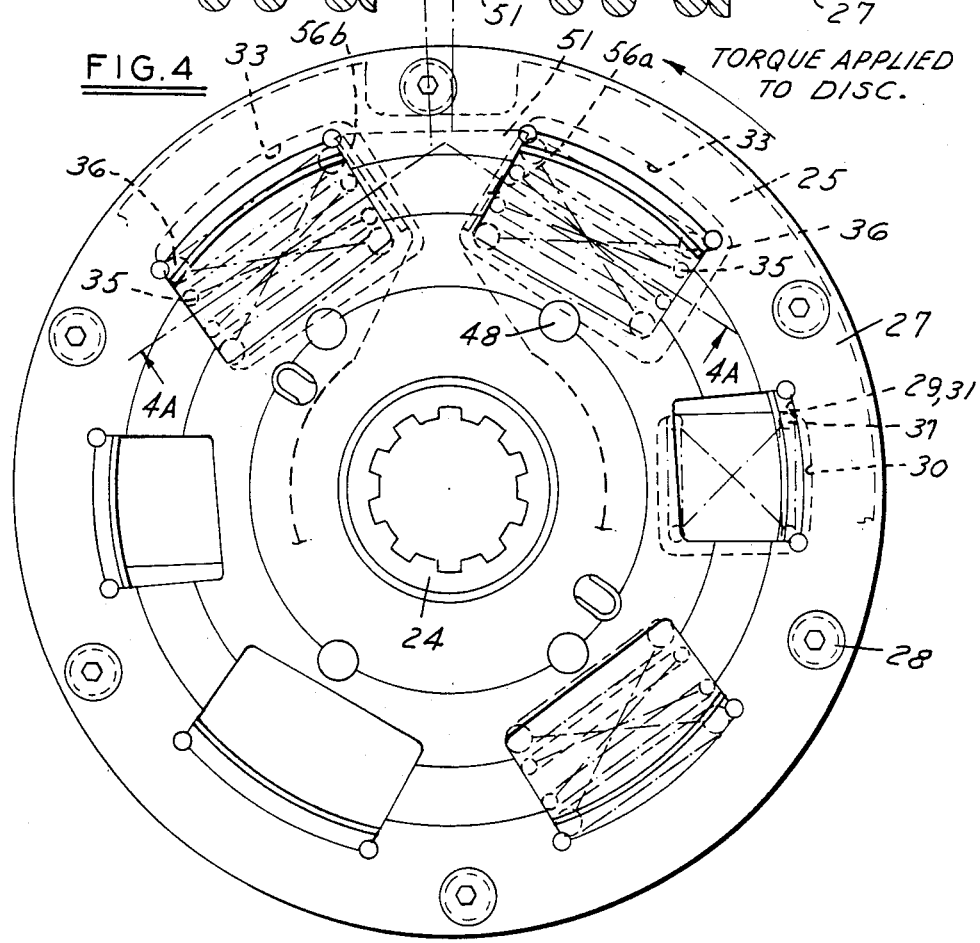
FIG.4
TORQUE APPLIED TO DISC.

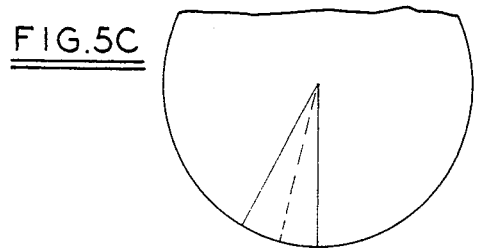
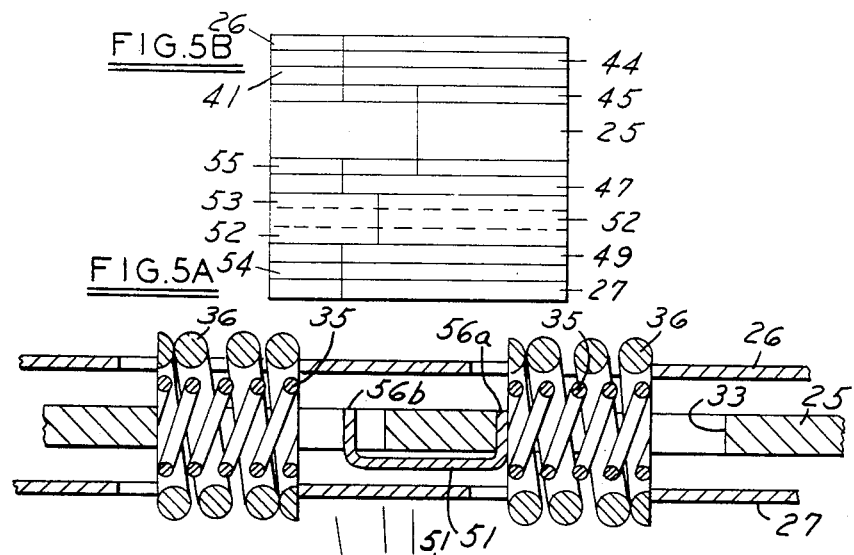
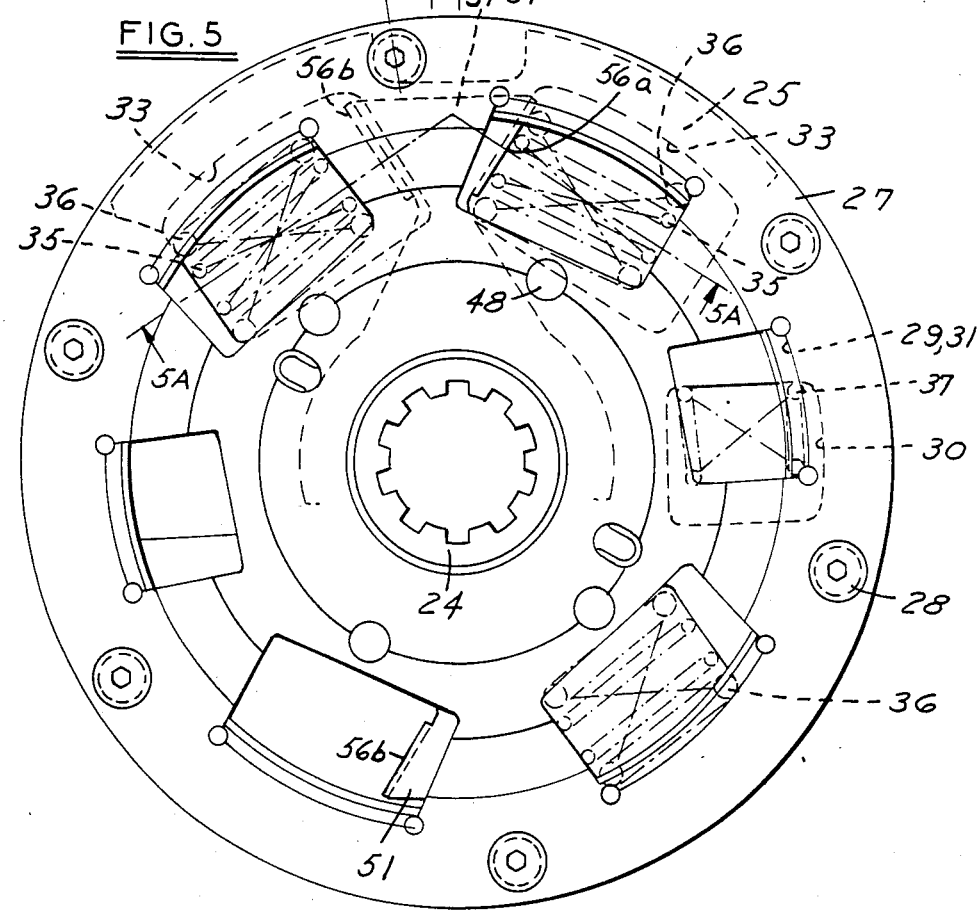

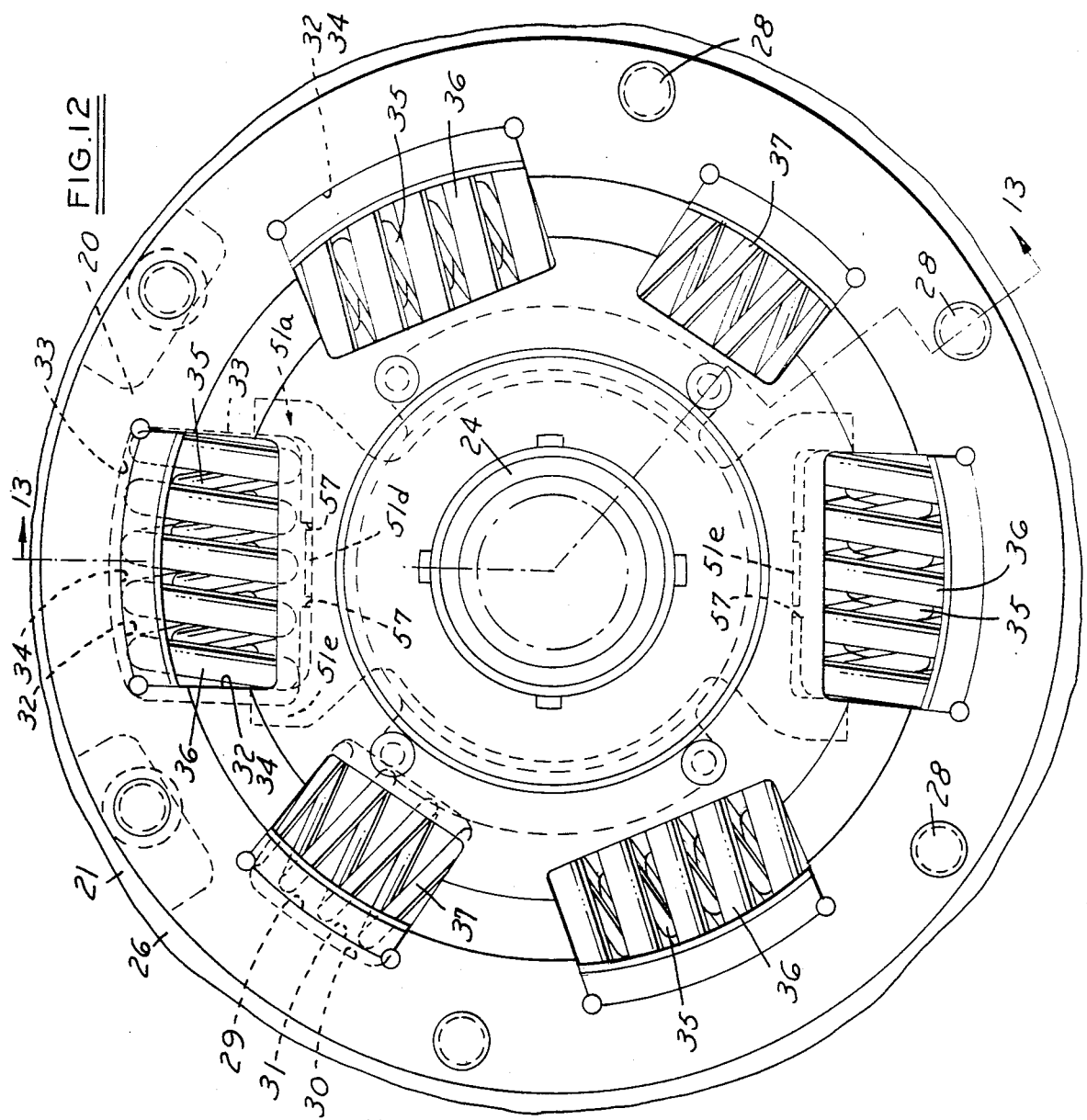
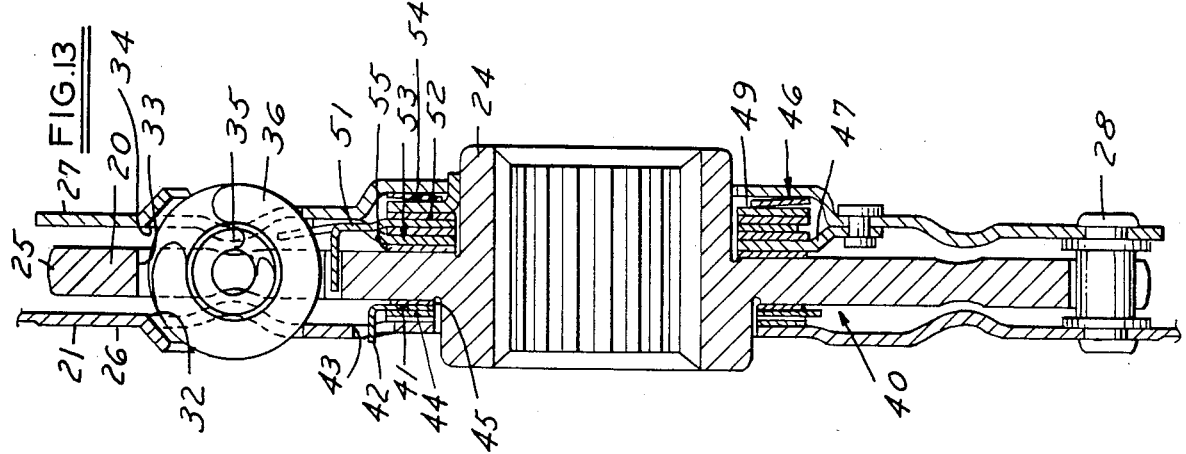

CLUTCH DISC ASSEMBLY

This invention relates to clutch disc assemblies.

BACKGROUND AND SUMMARY OF THE INVENTION

In clutches for automotive vehicles and the like, it is common to use a clutch disc assembly comprising a drive member in the form of a disc and a driven member with circumferentially spaced springs interposed in aligned openings in the disc and driven member that are operable to function in stages. The springs forming the first stage function to reduce vibration and noise in the neutral or non-driving position and the springs of the second stage function to provide the drive as the clutch is engaged. In order to further reduce the noise, it has been common to provide friction means between the driving disc and driven member. Hysteresis is a name given to the frictional torque in a clutch disc damper. Reducing or eliminating neutral rollover noise in some vehicles requires a first stage with low spring rates and low hysteresis levels. However, best performance in the load carrying second stage may require a relatively high hysteresis. Very often the range of hysteresis which provides the best neutral performance does not overlap the hysteresis range which gives the best performance in a driving condition. In a case such as this, a damper with the same hysteresis level in each stage may not provide acceptable performance under both conditions. A device which allows the hysteresis to be tuned to a higher level in the second stage than the first is therefore desirable.

Inasmuch as the requirements for idling differ substantially from those in the driving position, the friction preferably should be at a low level in the first stage and isolated from the friction in the second stage such that the frictional torque or hysteresis is less in the first stage than in the second stage in order to provide the best performance.

Accordingly, among the objects of the present invention are to provide a clutch disc assembly wherein the friction of the first stage is independent of the second stage and wherein the friction of the second stage can be changed without affecting the friction of the first stage.

DESCRIPTION OF THE DRAWINGS

FIG. 1 is a plan view of a clutch disc assembly embodying the invention.

FIG. 2 is a fragmentary view taken along the line 2—2 in FIG. 1.

FIGS. 4, 4A, 4B, 4C are views similar to FIGS. 3, 3A, 3B and 3C, respectively, showing the parts in a different operative position.

FIGS. 5, 5A, 5B, 5C are similar views showing the parts in a further operative position.

FIG. 12 is a plan view of a modified form of clutch disc assembly.

FIG. 13 is a sectional view taken along the lines 13—13 in FIG. 12.

DESCRIPTION

Figure 3C:
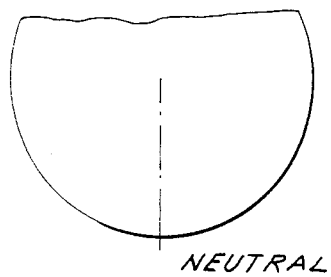
FIG. 3C is a diagram of the relative positions of the parts in the clutch disc assembly of FIGS. 3, 3A and 3B.
Figure 3B:
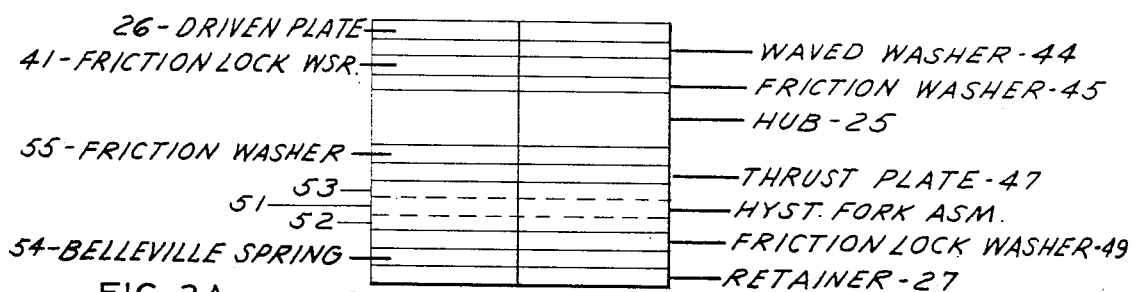
FIG. 3B is a diagrammatic view of the parts and friction members of the clutch disc assembly shown in FIGS. 3 and 3A.
Figure 3A:
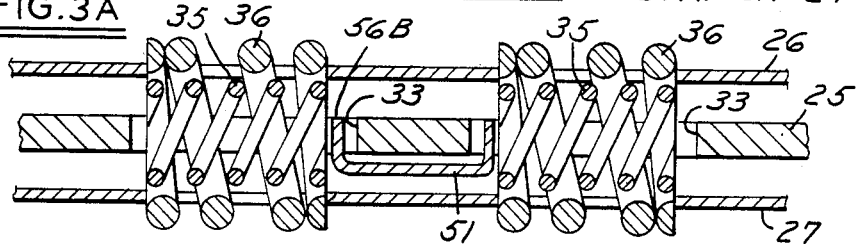
FIG. 3A is a fragmentary sectional view taken along the line 3A—3A in FIG. 3.
Figure 3:
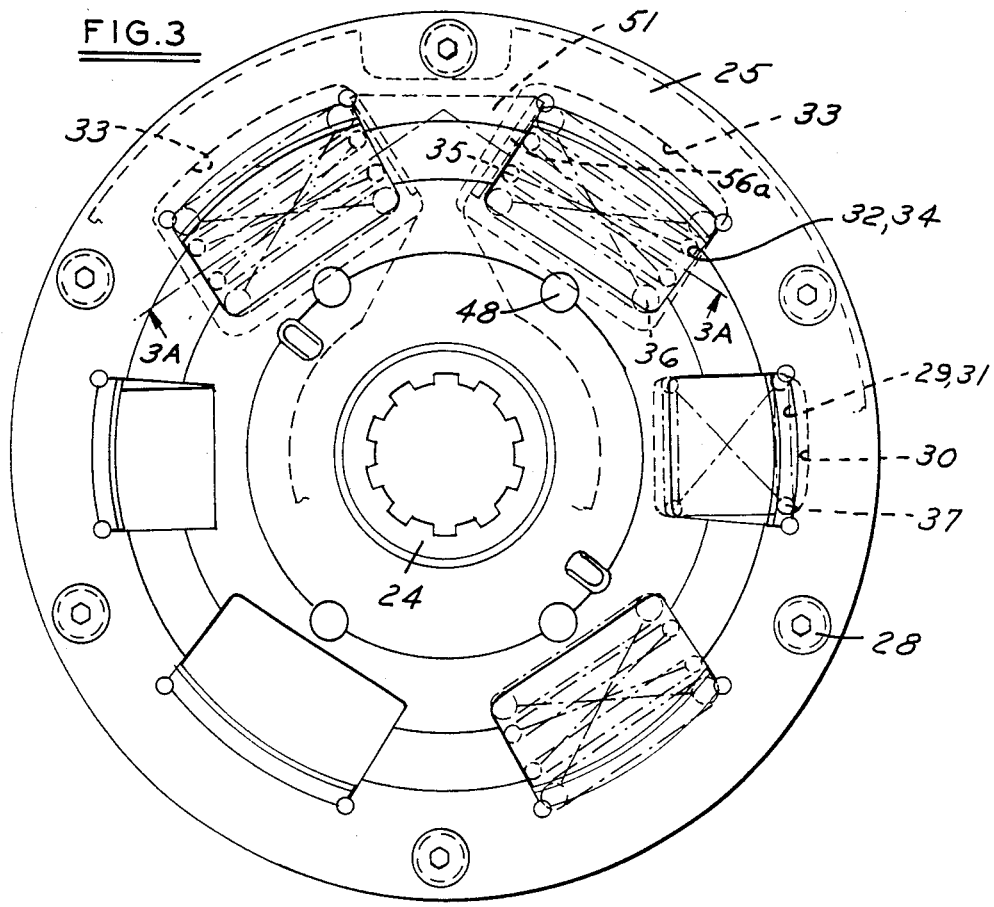
FIG. 3 is a partly diagrammatic view of a clutch disc assembly.

Referring to FIGS. 1 and 2, clutch disc assembly embodying the invention comprises a driven member 20 that is driven from a clutch connection to an engine and a drive member 21 which has friction facing 22, 23 thereon. More specifically, the driven member 20 includes a hub 24 and a disc 25. The drive member 21 includes a plate 26 on one side of the disc 25 and a retainer plate 27 on the other side of the disc 25, the plate 26 and retainer 27 being interconnected by stop pins 28 so that they will move or rotate in unison. The plate 26, disc 25 and retainer 27 are provided with a first set of aligned openings 29, 30, 31, respectively, in which first stage helical springs 37 are positioned. The plate 26, disc 25 and retainer 27 are also provided with a second set of aligned openings 32, 33, 34 in which sets of second stage helical springs are positioned, each comprising an inner helical spring 35 and an outer helical spring 36 telescoped within one another. As shown in FIG. 1, two first stage springs 37 and associated openings are provided and four sets of second stage springs 35 and 36 and associated openings are provided.

The spring openings 33 in the hub disc 25 are longer than the corresponding openings 32, 34 in the plate 26 and retainer 27 to allow limited hub movement without incurring the second stage rate.

In accordance with the invention, a first stage friction assembly 40 is interposed between the plate 26 and the disc 25 and comprises a friction lock washer 41 telescoped over the hub 24 and having a tab 42 that extends axially into an opening 43 in the plate 26 so that the lock washer 41 will move in unison with the plate 26. The first stage friction assembly 40 further includes a spring in the form of an undulating or wave washer 44 interposed between the plate 26 and the lock washer 41 urging the lock washer 41 against a washer 45 that is interposed between the disc 25 and the friction lock washer 41. The washer 45 is made of a material such as Teflon so that there is minimal friction between the lock washer 41 and the disc 25.

As the friction lock washer 41 and thrust plate 47 rotate relative to the disc 25, the friction washer 45, 55 must slide relative to the disc and/or friction lock washer 41 and the disc 25 and/or thrust plate 47, respectively. The friction generated is the Coulomb damping or hysteresis needed to dampen the action of the springs. The level of the hysteresis can be controlled through the friction properties of the friction washer material and the axial load exerted by the waved washer 44. The first stage springs 31 are very compliant to allow the damper to react to engine pulses while the transmission is in neutral. Likewise, the hysteresis levels required are relatively small.

A second friction assembly 46 which is intended to operate independently of the friction assembly 40 is provided in association with the retainer 27 and includes a thrust plate 47 that is mounted on the retainer plate 27. Tabs 48 on the thrust plate 47 extend through openings in retainer 27 to hold the thrust plate 47 and retainer 27 in assembled relation. A friction pack is interposed between the thrust plate 47 and the retainer 27 and includes a lock washer 49 having a tab 50 extending into an opening in retainer 27 so that it rotates with the retainer 27, a fork 51, friction material 52, 53 interposed between the thrust plate 47 and fork 51 and between the fork 51 and the lock washer 49, respectively, and a spring in the form of a Belleville washer 54 interposed between the lock washer 49 and the retainer plate 27 to yieldingly urge the lock washer 49, the friction material 52, 53 and the fork 51 toward the thrust plate 47. The Belleville Spring 54 maintains a relatively constant force on the friction pack as the friction material 52, 53 wears. The friction material 52, 53 can be bonded either to the fork 51 or the associated thrust plate 47 or lock washer 49 or may be unbonded. A washer 55 is provided between the thrust plate 47 and the disc 25 and is made of a low friction material such as Teflon to minimize the friction and isolate the action of the second stage friction means from the first stage friction means.

The fork preferably includes axial tabs 56a, 56b that extends into openings 33 in disc 25 so that upon predetermined relative movement, the disc 25 will become engaged with one or the other tabs 56a, 56b depending on the direction of the torque and the disc 25 and fork 51 will move in unison, to compress spings 35,36. The forces exerted by the springs hold the tabs 56a, or 56b against the sides of the openings 33 in disc 25.

When the disc 25 is driven past the first stage into the second stage, the second stage friction pack 46 becomes operational.

The level of hysteresis in the second hysteresis device is controlled by friction properties of the friction material 52 and 53 and the axial load exerted by the Belleville spring 54 through the friction lock washer 49 and hysteresis fork assembly 51 to the thrust plate 47. The springs 35, 36 used in the secondary stage are relatively stiff to transmit engine torque to the transmission. Likewise, the hysteresis level is relatively high to damp the torque oscillations caused by the engine firing.

It can thus be seen that the clutch disc assembly provides two different friction levels in the damper stages. The first stage friction is independent of the second stage friction while the damper operates in the first stage. The effect of the first stage friction is cumulative with the second stage friction when the damper is operating in the second stage.

The primary or first stage hysteresis device remains operational during the second stage. The primary hysteresis device is tuned to give the best performance when the disc is in the first stage (transmission in neutral). The secondary hysteresis device is then tuned to add the hysteresis necessary for best performance in the second stage (transmission in gear with the clutch engaged.)

As torque is applied to the disc, the friction lock washer 41 and thrust plate 47 begin to rotate relative to the hub 24 (see FIGS. 3, 3A, 3B, 3C, 4, 4A, 4B, and 4C). The axial load exerted by the wave washer 44 is transmitted through the friction lock washer 41, friction washer 45, hub 24, disc 25 and friction washer 55 against the thrust plate 47.

When the torque capacity of the compliant first stage is exceeded, the second stage begins to operate (see FIGS. 4, 4A, 4B, and 4C and 5, 5A, 5B, and 5C). One end of each second stage spring 36 comes in contact with the edge of the windows 33, or the tabs on the hysteresis fork which extend into the windows 33. The tab is held against the hub by the second stage spring 36 throughout the rotation in the second stage. The hysteresis fork assembly cannot rotate relative to the hub in the second stage.

Figure 6:
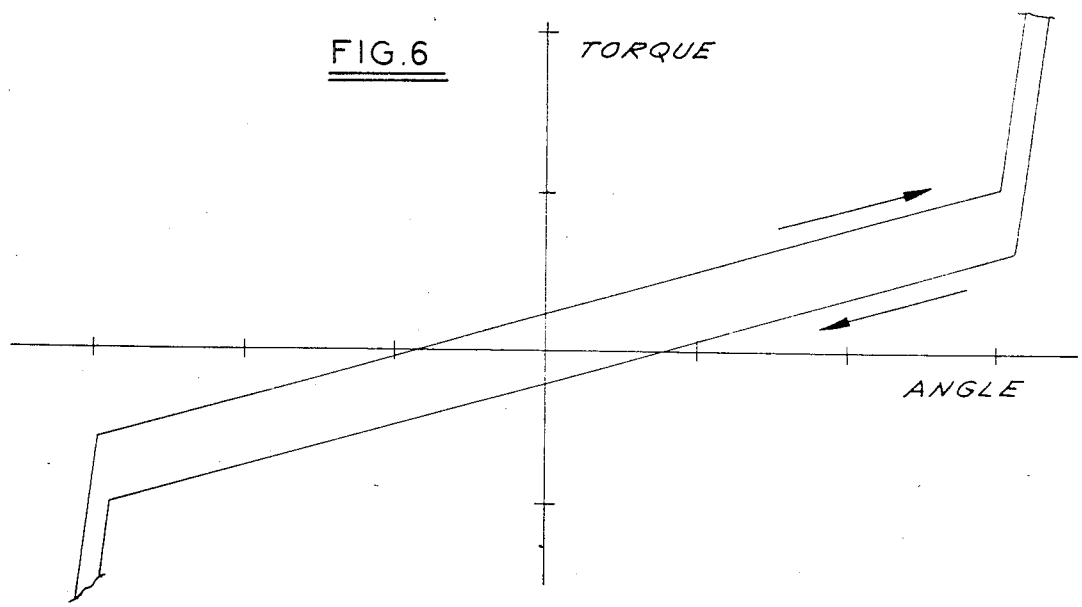
FIG. 6 is a hysteresis curve of the clutch disc assembly shown in FIGS. 1-5.
Figure 7:
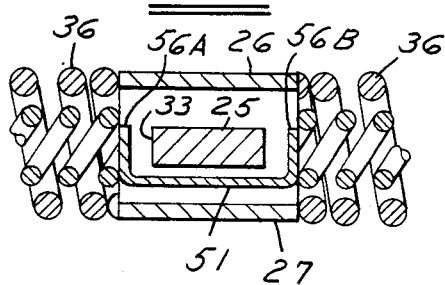
FIGS. 7 and 8 are partly diagrammatic sectional views showing the parts in different operative positions.
Figure 8:
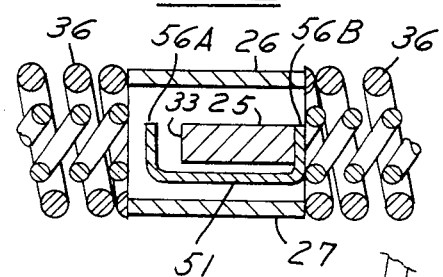
Figure 9:
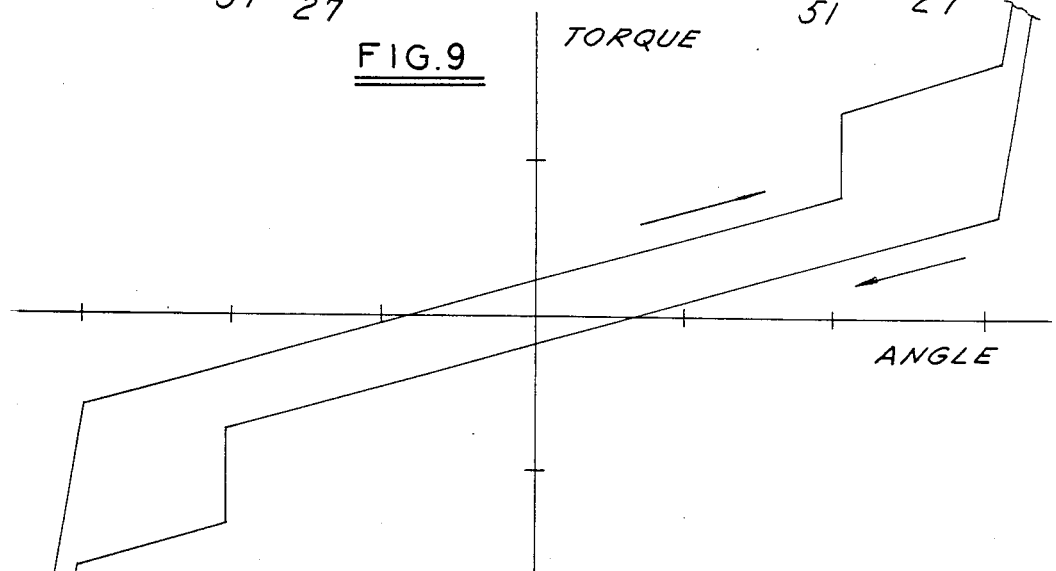
FIG. 9 is a hysteresis curve of a clutch disc assembly shown in FIGS. 10 and 11.
Figure 10:
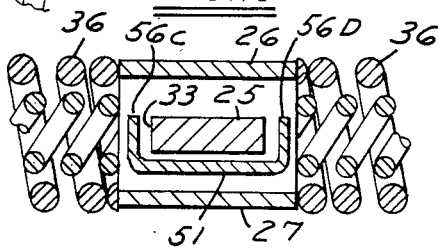
FIGS. 10 and 11 are part sectional views of a modified form of a clutch disc assembly.
Figure 11:
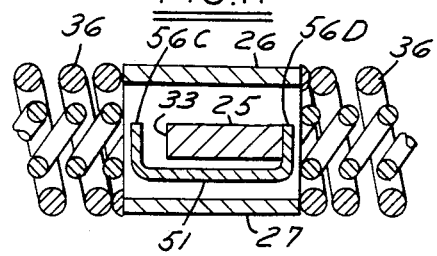

The operation of the clutch disc assembly produces a hysteresis curve as shown in FIG. 6 during the first stage movement, shown in FIGS. 7 and 8. However, as shown in FIGS. 9, 10 and 11, the initiation of the second hysteresis stage can be timed to precede the start of the second spring stage by designing the fork 51 such that the tabs 56c and 56d are not in contact with the springs 35, and 36 when the disc is in the neutral position. The second hysteresis stage can be made to start prior to initiation of the second spring stage any desired amount by reducing the distance between tabs 56c and 56d such that if tab 56c is in contact with a set of springs 35 and 36 there will be a gap between the tab 56b and adjacent springs 35 and 36. As the disc 25 rotates into its second stage, two of the openings 33 opposite each other will contact one pair of the tabs 56a or 56b, depending on the direction of the torque, on the fork 51. These tabs in turn contact the springs 35 and 36. When the second stage springs are in neutral position, the secondary friction pack becomes inactive and the first stage friction pack becomes the relevant friction source.

In the form of the invention shown in FIGS. 12 and 13, the fork 51a straddles the springs 36 and includes tabs 51d, 51e that extend into a notch 57 in disc 25 so that upon predetermined relative moment, the disc 25 will become engaged with one or the other end of notch 57 and the disc 25 and fork 51a will move in unison, as in the prior form of the invention.

I claim:
1. A clutch disc assembly comprising
 a drive clutch hub having a radial disc,
 a driven plate on one side of said disc,
 a retainer plate on the opposite side of said disc and interconnected for movement with said driven plate,
 said disc, driven plate and retainer plate having generally aligned openings,
 first spring means in some of said openings,
 second spring means in others of said aligned openings,
 first stage friction means between said disc and said driven plate, and
 second stage friction means comprising a thrust plate attached to said retainer plate and friction means interposed between said retainer plate and said thrust plate,
 said second stage friction means comprising a fork, a lock washer on said hub and friction material interposed between said fork and said lock washer.

2. The clutch disc assembly set forth in claim 1 including spring means yieldingly urging said fork toward said thrust plate.

3. The clutch disc assembly set forth in claim 2 wherein said spring means comprises a Belleville spring.

4. The clutch disc assembly set forth in claim 3 wherein said fork includes means operable upon relative rotation between said disc and said fork to interengage said disc and said fork such that they move in unison.

5. The clutch disc assembly set forth in claim 4 wherein said fork includes means operable to engage said second spring means such that the springs will return both the fork and the disc to an initial neutral position when the torque is relaxed.

6. The clutch disc assembly set forth in claim 4 wherein said spring means comprises a helical spring.

7. The clutch disc assembly set forth in claim 1 wherein said first friction means comprises a friction lock washer operable for movement with said retainer plate, and spring means interposed between said retainer plate and said friction lock washer.

8. The clutch and disc assembly set forth in claim 7 including a friction washer interposed between said friction lock washer and said disc.

9. The clutch disc assembly set forth in claim 8 wherein said second stage friction comprises a fork interposed between said thrust plate and said retainer plate and rotatably with said hub, a lock washer interposed between said fork and said retainer plate and operable to rotate with said retainer, friction means interposed between said thrust plate and said fork and between said fork and said lock washer, spring means interposed between said retainer plate and said lock washer axially compressing said lock washer, friction means and fork toward said thrust plate.

10. The clutch disc assembly set forth in claim 9 including friction means interposed between said thrust plate and said disc.

11. A clutch disc assembly comprising
a drive clutch hub having a radial disc,
a driven plate on one side of said disc,
a retainer plate on the opposite side of said disc and interconnected for movement with said driven plate,
said disc, driven plate and retainer plate having generally aligned openings,
first spring means in some of said openings,
second spring means in others of said aligned openings,
first stage friction means between said disc and said driven plate, and
second stage friction means comprising a thrust plate attached to said retainer plate and friction means interposed between said retainer plate and said thrust plate,
said second stage friction means comprising a fork, a lock washer and friction material interposed between said fork and said lock washer, said fork engaging said second stage springs such that a second hysteresis stage will start prior to initiation of the second spring stage.

12. A clutch disc assembly comprising
a drive clutch hub having a radial disc,
a driven plate on one side of said disc,
a retainer plate on the opposite side of said disc and interconnected for movement with said driven plate,
said disc, driven plate and retainer plate having generally aligned openings,
first spring means in some of said openings,
second spring means in others of said aligned openings,
first stage friction means between said disc and said driven plate, and
second stage friction means comprising a thrust plate attached to said retainer plate and friction means interposed between said retainer plate and said thrust plate,
said second stage friction means comprising a fork, a lock washer and friction material interposed between said fork and said lock washer, said fork being positioned to engage adjacent sets of second stage springs.

13. A clutch disc assembly comprising
a drive clutch hub having a radial disc,
a driven plate on one side of said disc,
a retainer plate on the opposite side of said disc and interconnected for movement with said driven plate,
said disc, driven plate and retainer plate having generally aligned openings,
first spring means in some of said openings,
second spring means in others of said aligned openings,
first stage friction means between said disc and said driven plate, and
second stage friction means comprising a thrust plate attached to said retainer plate and friction means interposed between said retainer plate and said thrust plate,
said second stage friction means comprising a fork, a lock washer and friction material interposed between said fork and said lock washer, said fork straddling one set of second stage springs.

* * * * *